United States Patent [19]

Seetharam et al.

[11] Patent Number: 5,771,228
[45] Date of Patent: Jun. 23, 1998

[54] METHOD AND APPARATUS FOR RECOVERY OF PEAK CELL RATE TOKENS IN AN ATM NETWORK INTERFACE

[75] Inventors: Srini Wishnu Seetharam, Gaithersburg, Md.; Minette Ashley Dannhardt, Fairfax, Va.

[73] Assignee: Integrated Telecom Technology, Inc., Gaithersburg, Md.

[21] Appl. No.: 648,710

[22] Filed: May 16, 1996

[51] Int. Cl.$^6$ ..................................................... H04J 3/14
[52] U.S. Cl. .......................... 370/252; 370/395; 370/397; 370/419
[58] Field of Search .................... 370/252, 233, 370/234, 232, 235, 395, 230, 397, 412, 352, 419, 231

[56] References Cited

U.S. PATENT DOCUMENTS

| | | | |
|---|---|---|---|
| 5,179,556 | 1/1993 | Turner | 370/233 |
| 5,448,567 | 9/1995 | Dighe et al. | 370/395 |
| 5,577,035 | 11/1996 | Hayter et al. | 370/412 |
| 5,579,302 | 11/1996 | Banks | 370/397 |
| 5,625,622 | 4/1997 | Johri | 370/395 |

*Primary Examiner*—Douglas W. Olms
*Assistant Examiner*—Shick Hom
*Attorney, Agent, or Firm*—Townsend and Townsend and Crew

[57] ABSTRACT

A method and apparatus are described for transmitting data cells in an ATM network having a plurality of connections. A first number of tokens are allocated to a selected one of the plurality of connections. Data cells are transmitted from the selected connection at a peak cell rate while the first number is greater than zero. The first number is decremented by one for each data cell transmitted by the selected connection at the peak cell rate. Data cells are then transmitted from the selected connection at a sustainable cell rate which is less than the peak cell rate while the first number is zero. The first number is incremented by a variable increment during an idle period in which the selected connection does not transmit data cells. The variable increment increases in value as the idle period increases in duration.

17 Claims, 4 Drawing Sheets

METHOD AND APPARATUS FOR RECOVERY OF PEAK CELL RATE TOKENS IN AN ATM NETWORK INTERFACE

BACKGROUND OF THE INVENTION

The present invention relates to the transmission of data cells in a variable bit rate (VBR) cell transmission system such as an asynchronous transfer mode (ATM) network. More specifically, the invention relates to the use and recovery of peak cell rate tokens associated with a particular network connection.

One method for facilitating allocation of transmission bandwidth among the various connections of an ATM network involves the use of peak cell rate tokens. The number of peak cell rate tokens associated with a particular connection, e.g., a work station, corresponds to the number of data cells which the connection may schedule to transmit at its peak cell rate. Typically, an ATM network has some absolute number of peak cell rate tokens which it allocates among its various connections, each of which has an associated maximum number of tokens which it can accumulate. When a particular connection has peak cell rate tokens and data cell traffic to be transmitted, it is scheduled to transmit the data cells at the peak cell rate until it runs out of tokens. The peak cell rate token count for a particular connection is decremented by one for each data cell transmitted by that connection at the peak cell rate. When the connection runs out of tokens, subsequent data cells are transmitted at the connection's sustainable cell rate until more tokens for that connection are accumulated or recovered. The sustainable cell rate is essentially the transmission rate at which all of a network's connections may "simultaneously" transmit data without exceeding the network's bandwidth. The purpose of such a token scheme is to prevent high bandwidth connections from consuming more than their fair share of the network's transmission bandwidth.

One method for recovering peak cell rate tokens for a particular connection once they have been exhausted involves incrementing the token count during periods in which the associated connection is idle. Typically, a connection is prevented from transmitting data cells, i.e., placed in an idle state, unless it has enough data cells present to maintain cell transmission at the sustainable cell rate. For each time slot during which the connection is scheduled to transmit a data cell but does not do so, the token count is incremented by one. Unfortunately, for connections with a large maximum token limit, this process turns out to be rather expensive in terms of processing and scheduling resources. This is due to the fact that each connection, though idle, must continue to be scheduled at the sustainable cell rate merely to recover its peak cell rate tokens. Thus, precious processing resources are consumed by network connections which have no cell traffic to send. A method and apparatus for facilitating the recovery of peak cell rate tokens which reduces this consumption of processing and scheduling resources is therefore desirable.

SUMMARY OF THE INVENTION

The present invention provides a method and apparatus for facilitating the recovery of peak cell rate tokens in a VBR cell transmission system which reduces the processing and scheduling overhead associated with the accumulation of such tokens. The cell transmission system described herein operates similarly to the system described above except the manner in which peak cell rate tokens are recovered. Rather than incrementing the token count by one for each scheduled transmission time slot during which the connection is idle, the present invention increases the amount by which the token count is incremented for each consecutive idle time slot. For example, according to a specific embodiment of the invention, the cell count is incremented by one for the first idle time slot, by two for the next idle time slot, by four for the next, etc. That is, peak cell rate tokens are recovered using a variable increment which increases exponentially with each successive idle time slot.

Moreover, unlike the system described in the Background of the Invention, the present invention does not continue to schedule successive idle time slots for a particular connection at the sustainable cell rate. Instead, the present invention reduces the rate at which idle time slots are scheduled for each successive and consecutive idle time slot. For example, according to a specific embodiment of the invention, the first idle time slot is scheduled at the sustainable cell rate, the next idle time slot at one-half the sustainable cell rate, the next at one-fourth the sustainable cell rate, etc. That is, the rate at which consecutive idle time slots for a particular connection are scheduled decreases exponentially with each successive idle time slot. By combining this feature with the way in which the peak cell rate token count is incremented, the peak cell rate tokens for a particular connection may be recovered in substantially the same amount of time as the system described in the Background of the Invention with the use of fewer scheduling and processing resources.

Thus, according to the present invention, a method and apparatus are described for transmitting data cells in a network having a plurality of connections. A first number of tokens are allocated to a selected one of the plurality of connections. Data cells are transmitted from the selected connection at a peak cell rate while the first number is greater than zero. The first number is decremented by one for each data cell transmitted by the selected connection at the peak cell rate. Data cells are then transmitted from the selected connection at a sustainable cell rate which is less than the peak cell rate while the first number is zero. The first number is incremented by a variable increment during an idle period in which the selected connection does not transmit data cells. The variable increment increases in value as the idle period increases in duration.

According to a more specific embodiment of the invention, a series of time slots are scheduled for the selected connection to transmit data cells and the first number is then incremented by the variable increment for each scheduled time slot during which the selected connection does not transmit a data cell. According to a still more specific embodiment, the variable increment is increased according to an exponential progression for each consecutive time slot during which the selected connection does not transmit a data cell.

According to yet another more specific embodiment, each time slot is scheduled at a fraction of the sustainable cell rate. The fraction of the sustainable cell rate is then varied according to an exponentially decreasing progression for each consecutive time slot during which the selected connection does not transmit a data cell.

A further understanding of the nature and advantages of the present invention may be realized by reference to the remaining portions of the specification and the drawings.

DESCRIPTION OF SPECIFIC EMBODIMENTS

Figure 1:
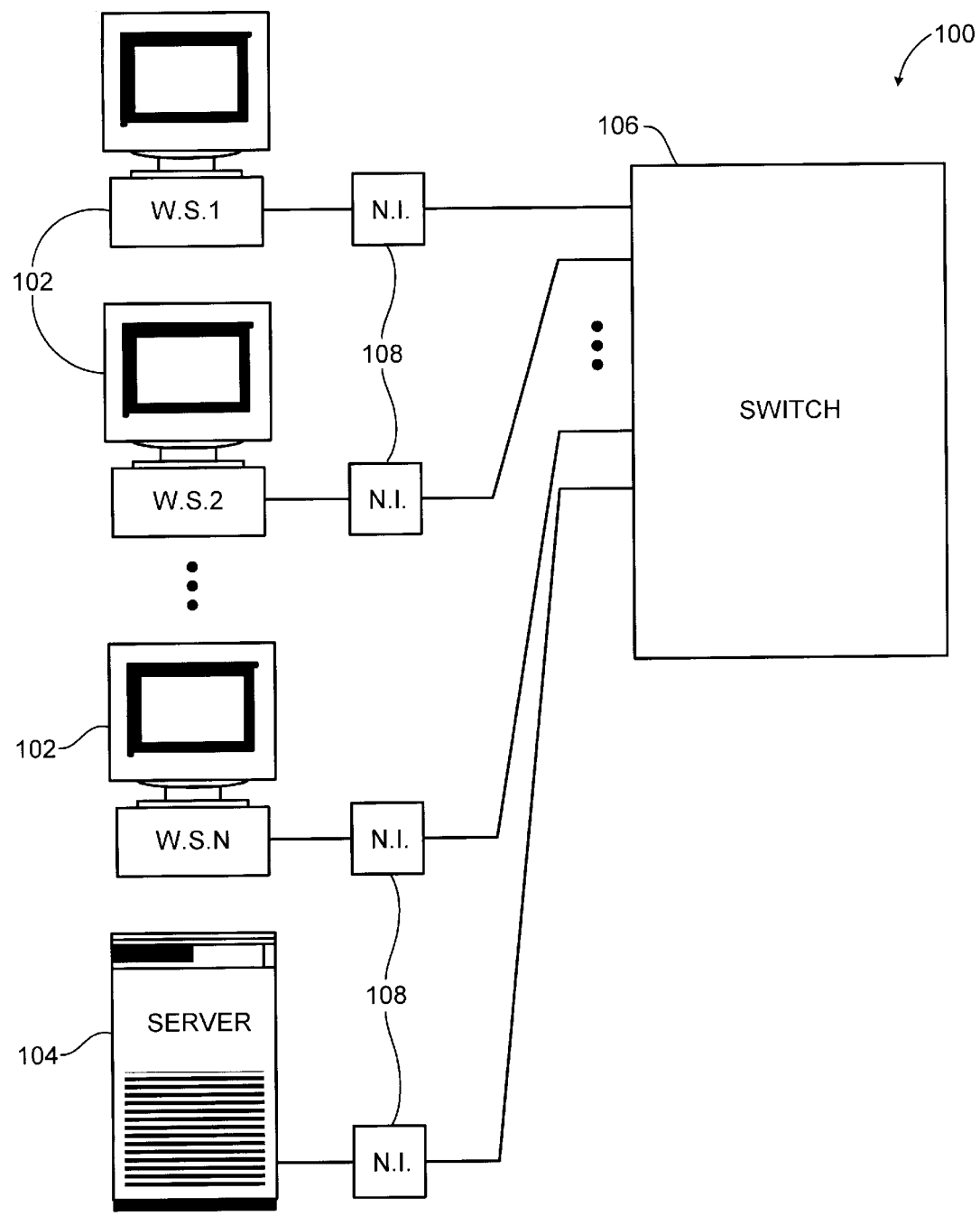
FIG. 1 is a simplified block diagram of a data cell transmission system for implementing a specific embodiment of the present invention.

FIG. 1 is a simplified block diagram of a data cell transmission system 100 for implementing a specific embodiment of the present invention. Work stations 102 and server 104 are system resources or "connections" which are interconnected via switching device 106. Each connection is coupled to switching device 106 via network interfaces 108. System 100 may be any type of data cell system for transmitting and receiving voice, video, and digital data such as, for example, an ATM network. Moreover, switching device 106 may be any of a variety of different configurations of hardware for any type of cell transmission technology. For example, switching device 106 may comprise a single ATM switch element, or an ATM switch fabric comprising a plurality of ATM switch elements such as the ATM switch fabric architecture and switch element described in commonly assigned, copending U.S. patent application Ser. No. 08/235,006 entitled ATM ARCHITECTURE AND SWITCHING ELEMENT, filed on Apr. 28, 1994, the entire specification of which is incorporated herein by reference.

Figure 2:
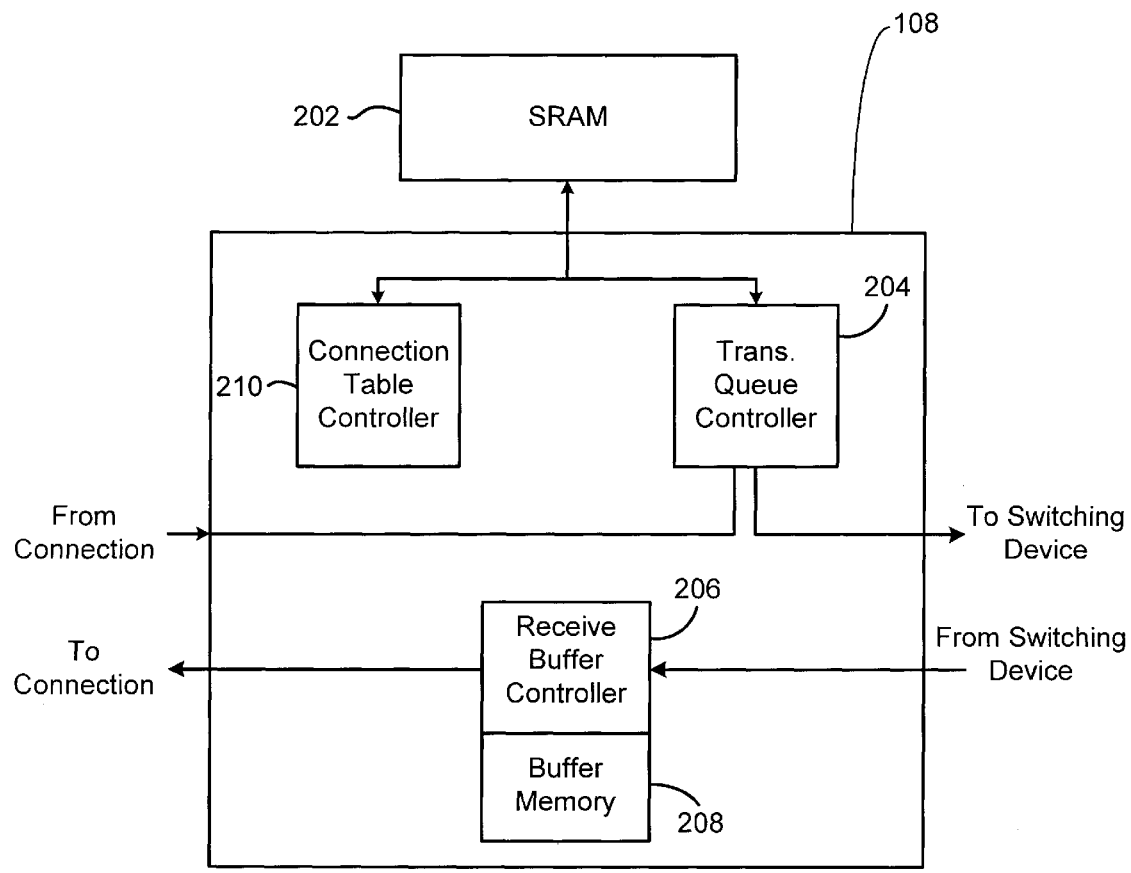
FIG. 2 is a simplified block diagram of the network interface of FIG. 1.

As shown in FIG. 2, network interface 108 is a combination storage and control device that is used with external memory, e.g., SRAM 202, and includes a transmission queue controller 204 which schedules data cells for transmission to the switching device. Transmission queue controller 204 maintains a count of the peak cell rate tokens held by the associated connection, e.g., work station. Network interface 108 also includes a receive buffer controller 206 which receives data from the switching device. Receive buffer controller 206 includes a buffer memory 208 for storing cells received from the switching device. A further controller, called a connection table controller 210, is for reading header information from the connection and is operative to use that header information to add an appropriate switch tag, i.e., destination address information, to the cells before they are transmitted to the switching device. Controller 210 also stores information about switch tags and buffers data in external SRAM 202.

Figure 3:
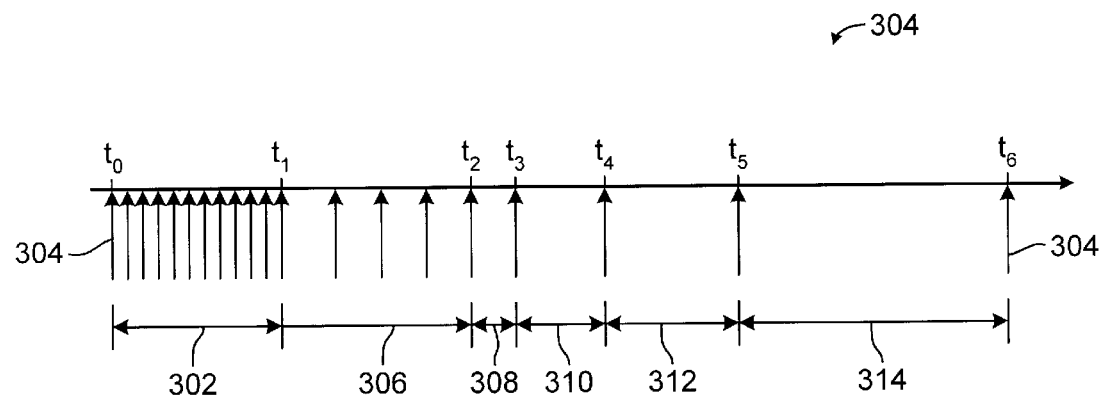
FIG. 3 is a time line illustrating the use and recovery of peak cell rate tokens for a particular connection in a network according to a specific embodiment of the invention.

FIG. 3 is a time line 300 illustrating the use and recovery of peak cell rate tokens for a particular connection in a network according to a specific embodiment of the invention. This example assumes that the connection begins with a full complement of twelve peak cell rate tokens at $t_0$. During interval 302, the connection's transmission queue controller schedules transmission opportunities 304 and transmits data cells at the peak cell rate until all of its tokens (one per data cell) have been exhausted at $t_1$. During interval 306, the controller schedules opportunities 304 and transmits data cells at the sustainable cell rate until it no longer has enough data cell traffic to continue transmitting cells at the sustainable cell rate, at which time the connection goes idle (i.e., at $t_2$). For the first idle interval 308, the controller schedules a transmission opportunity 304 at the sustainable cell rate, at which point, if there is no cell traffic to be transmitted, the connection recovers one peak cell rate token (i.e., at $t_3$). For the second idle interval 310, the controller schedules a transmission opportunity 304 at $t_4$ which corresponds to one-half the sustainable cell rate. If there is still no cell traffic, two tokens are recovered at $t_4$. Following an interval 312 corresponding to one-fourth the sustainable cell rate the controller schedules another transmission opportunity at $t_5$. If no cells are transmitted at $t_5$, four tokens are recovered. Finally, the controller schedules a transmission opportunity at $t_6$, following interval 314 which, according to one embodiment, corresponds to one-eighth the sustainable cell rate. According to another embodiment, interval 314 corresponds to the sustainable cell rate divided by the number of tokens still to be recovered, in this case, five. If no traffic is available for transmission during this interval, five tokens are recovered to bring the total number of tokens to 12, the maximum allowable for the connection. If at any time during or after this process, cell traffic becomes available, it is scheduled and transmitted at the peak cell rate until the tokens are once again exhausted.

As can be seen, the number of peak cell rate tokens recovered at successive transmission opportunities at which no cells are transmitted increases exponentially according to the exponential progression $2^x$, where x=0, 1, 2, 3 . . . . At the same time, the rate at which transmission opportunities are scheduled during the idle period decreases exponentially according to the progression $\frac{1}{2}^x$, where x=0, 1, 2, 3 . . . . The result is that peak cell rate tokens are completely recovered in a similar amount of time as the situation described in the Background while presenting a far lighter burden on the connection's processing and scheduling resources because fewer transmission opportunities need to be scheduled, i.e., four vs. twelve.

According to an alternate embodiment, the recovery of peak cell rate tokens proceeds at the exponential rate until the number of tokens remaining to be recovered is less than the next number in the exponential progression. In the example above, when the exponential progression reached eight, i.e., when a transmission opportunity was scheduled at one-eighth the sustainable cell rate, there were only five tokens to be recovered to bring the total back to the maximum of twelve, i.e., less than eight tokens remaining to be recovered. In this alternate embodiment, the transmission opportunity is scheduled at one-fifth the sustainable cell rate to correspond to the number of tokens to be recovered. This reduces the time required to recover all of the tokens to correspond to the number of tokens to be recovered.

Figure 4:
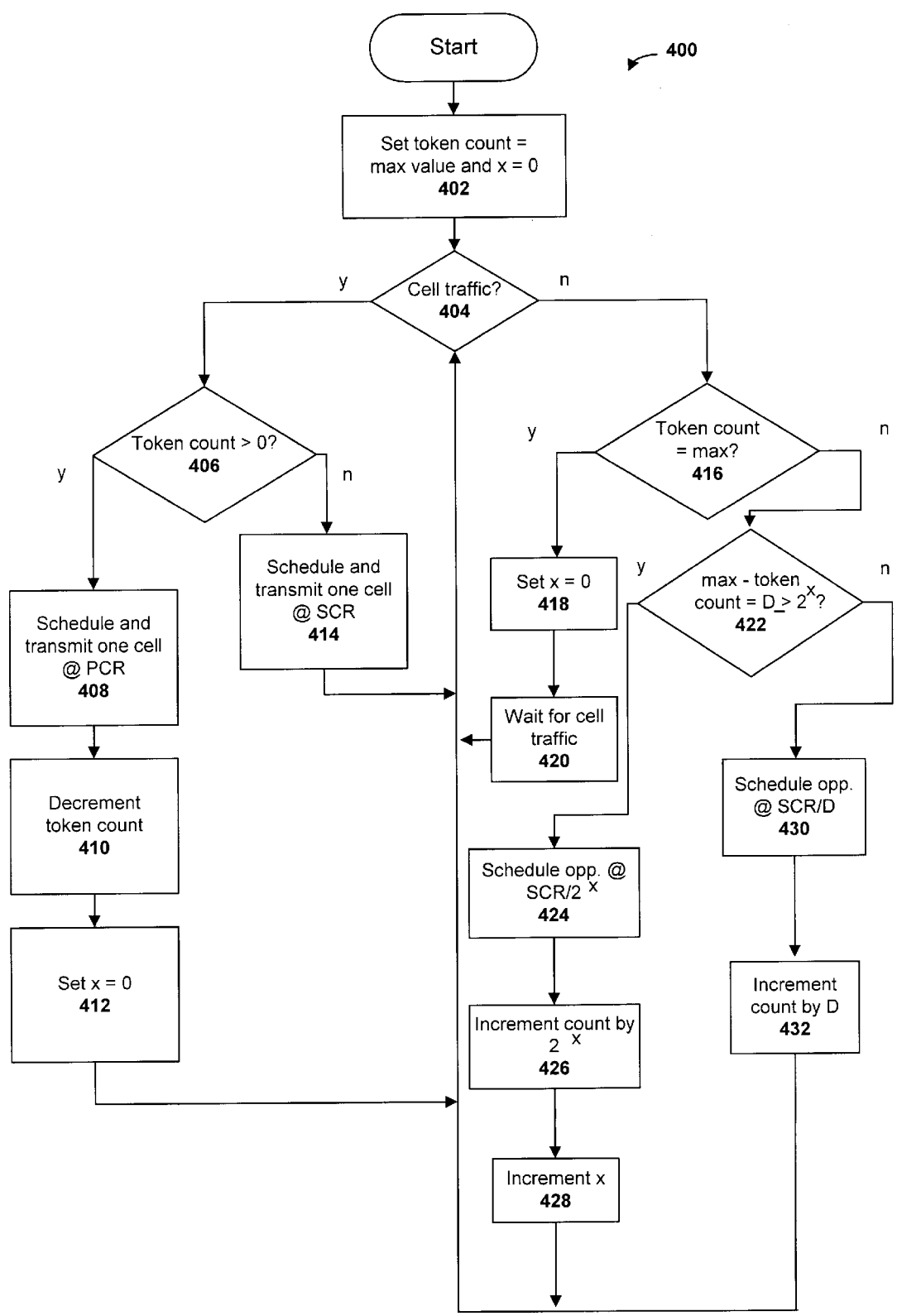
FIG. 4 is a flowchart describing the operation of a specific embodiment of the invention.

FIG. 4 is a flowchart 400 describing the operation of a specific embodiment of the invention. Initially, the peak cell rate token count is set at its maximum value and exponent x is set to zero (step 402). If there is data cell traffic to be transmitted (step 404) and the token count is greater than zero (step 406), one data cell is scheduled and transmitted at the peak cell rate (step 408), the token count is decremented by one (step 410), and exponent x is reset to zero (step 412). Then the network interface determines if there is any additional traffic. If the token count is determined at step 406 to be zero, data cells are scheduled and transmitted at the sustainable cell rate (step 414) until there is no data cell traffic available for transmission.

If there is no data cell traffic and the token count is determined to be at its maximum value (step 416), exponent x is reset to zero (step 418) and the network interface waits for traffic from its associated connection (step 420). If, however, the token count is not at its maximum value and the maximum value minus the current token count is greater than or equal to $2^x$ (step 422), the network interface schedules a transmission opportunity at the sustainable cell rate divided by $2^x$ (step 424). The token count is then incremented by $2^x$ (step 426) and x is incremented by one (step 428). The network interface then determines if there is any cell traffic to be transmitted. If, however, the difference, D, between the maximum token count and the current token count is determined to be less than $2^x$ at step 422, the network interface schedules a transmission opportunity at the sustainable cell rate divided by the difference (step 430) and increments the token count by the difference (step 432), thereby bringing the token count exactly to its maximum value. The network interface then once again looks for any cell traffic.

While the invention has been particularly shown and described with reference to specific embodiments thereof, it will be understood by those skilled in the art that the foregoing and other changes in the form and details may be made therein without departing from the spirit or scope of the invention. For example, reference is made above to ATM technology. However, one of ordinary skill in the art would know that the principles discussed herein apply to other types of switching technology such as, for example, ethernet switching technology. Moreover, the embodiment of FIGS. 1 and 2 is described with reference to workstations and a server. It will be understood that the general principles of the invention may also be employed for individual switch elements in a large switching network such as, for example, an ATM switch fabric. Therefore the scope of the invention should be determined by reference to the appended claims.

What is claimed is:

1. A method for transmitting data cells in a network having a plurality of connections, the method comprising the steps of:

allocating a first number of tokens to a selected one of the plurality of connections;

transmitting data cells from the selected connection at a peak cell rate while the first number of tokens is greater than zero;

decrementing the first number of tokens by one for each data cell transmitted by the selected connection at the peak cell rate;

transmitting data cells from the selected connection at a sustainable cell rate while the first number of tokens is zero, the sustainable cell rate being less than the peak cell rate; and incrementing the first number of tokens by a variable increment during an idle period in which the selected connection does not transmit data cells, the variable increment increasing in value as the idle period increases in duration.

2. The method of claim 1 further comprising the step of providing a second number of the tokens to be shared among the plurality of connections, the first number being a subset of the second number.

3. The method of claim 1 wherein the variable increment varies according to an exponentially increasing progression.

4. The method of claim 3 wherein the exponential progression comprises 2 where n represents a number of consecutive time slots during which the selected connection does not transmit a data cell.

5. The method of claim 1 wherein the variable increment varies according to a monotonically increasing progression.

6. The method of claim 1 wherein the variable increment varies according to a geometrically increasing progression.

7. The method of claim 1 wherein the incrementing step increases the first number up to a maximum allowable number of tokens for the selected connection.

8. The method of claim 1 wherein the incrementing step comprises the steps of:

scheduling a series of time slots for the selected connection to transmit data cells; and incrementing the first number by the variable increment for each time slot during which the selected connection does not transmit a data cell.

9. The method of claim 8 wherein the scheduling step comprises the steps of:

scheduling each time slot at a fraction of the sustainable cell rate; and varying the fraction of the sustainable cell rate for each consecutive time slot during which the selected connection does not transmit a data cell.

10. The method of claim 9 wherein the fraction of the sustainable cell rate varies according to an exponentially decreasing progression.

11. The method of claim 9 wherein the fraction of the sustainable cell rate varies according to an exponentially decreasing progression until the inverse of the fraction will be greater than a number of remaining tokens to be recovered, at which point the fraction of the sustainable cell rate at which a subsequent time slot is scheduled is equal to 1 divided by the second number.

12. The method of claim 8 wherein the first incrementing step further comprises the step of increasing the variable increment according to an exponential progression for each consecutive time slot during which the selected connection does not transmit a data cell.

13. An apparatus for transmitting data cells between a plurality of connections, comprising:

at least one switching device;

a plurality of network interfaces coupled to the at least one switching device and the plurality of connections, each network interface being associated with and coupled to one of the connections, each network interface being operable to maintain a count of a number of tokens, transmit data cells from the associated connection at a peak cell rate while the first number is greater than zero, decrement the first number by one for each data cell transmitted by the associated connection at the peak cell rate, transmit data cells from the associated connection at a sustainable cell rate while the first number is zero, the sustainable cell rate being less than the peak cell rate, and increment the first number by a variable increment during an idle period in which the associated connection does not transmit data cells, the variable increment increasing in value as the idle period increases in duration.

14. The apparatus of claim 13 wherein each network interface is further operable to schedule a series of time slots for the associated connection to transmit data cells, and increment the first number by the variable increment for each time slot during which the selected connection does not transmit a data cell.

15. The apparatus of claim 14 wherein each network interface is further operable to schedule each time slot at a fraction of the sustainable cell rate, and vary the fraction of the sustainable cell rate for each consecutive time slot during which the selected connection does not transmit a data cell according to an exponentially decreasing progression.

16. The apparatus of claim 13 wherein each network interface is operable to increase the variable increment according to an exponential progression for each consecutive time slot during which the selected connection does not transmit a data cell.

17. An apparatus for transmitting data cells from an associated network connection, comprising:

means for transmitting data cells from the associated connection at a peak cell rate while a number of tokens is greater than zero, and at a sustainable cell rate while the first number is zero, the sustainable cell rate being less than the peak cell rate; and means for decrementing the first number by one for each data cell transmitted from the associated connection at the peak cell rate, and incrementing the first number by a variable increment during an idle period in which the associated connection does not transmit data cells, the variable increment increasing in value as the idle period increases in duration.

* * * * *